US006095744A

United States Patent [19]

Harrison

[11] Patent Number: 6,095,744

[45] Date of Patent: Aug. 1, 2000

[54] REFUSE CONTAINER HANDLING SYSTEM

[76] Inventor: Ralph Harrison, 21607 S. Mountain Rd., Santa Paula, Calif. 93060

[21] Appl. No.: 08/784,254

[22] Filed: Jan. 15, 1997

[51] Int. Cl.[7] .......... B65G 3/04

[52] U.S. Cl. .......... 414/408; 294/111; 414/555; 414/812

[58] Field of Search .......... 414/406, 408, 414/486, 487, 555, 786; 294/90, 106, 111; 419/812

[56] References Cited

U.S. PATENT DOCUMENTS

| | | | |
|---|---|---|---|
| 2,824,655 | 2/1958 | Harbers | 414/486 |
| 3,016,157 | 1/1962 | Brisson | 414/408 |
| 3,325,024 | 6/1967 | Shubin | 414/406 |
| 3,446,377 | 5/1969 | Heinert | 414/408 |
| 3,765,554 | 10/1973 | Morrison | 414/408 |
| 3,837,512 | 9/1974 | Brown | 414/406 |
| 3,841,508 | 10/1974 | Ebeling et al. | 414/406 |
| 4,227,849 | 10/1980 | Worthington | 414/408 |
| 4,358,147 | 11/1982 | Hungerford | 294/106 X |
| 4,461,607 | 7/1984 | Smith | 414/406 |
| 4,566,840 | 1/1986 | Smith | 414/408 |
| 5,056,979 | 10/1991 | Niederer et al. | 414/421 |
| 5,209,537 | 5/1993 | Smith et al. | 294/111 |
| 5,222,853 | 6/1993 | Carson | 414/408 |
| 5,324,161 | 6/1994 | Thobe | 414/406 X |
| 5,391,039 | 2/1995 | Holtom | 414/408 |
| 5,419,671 | 5/1995 | Smith et al. | 414/421 |
| 5,513,937 | 5/1996 | Huntoon et al. | 414/408 |
| 5,513,942 | 5/1996 | Pickrell | 414/408 X |
| 5,525,022 | 6/1996 | Huntoon | 414/409 |
| 5,577,877 | 11/1996 | Smith et al. | 414/408 |
| 5,613,822 | 3/1997 | Gasparini et al. | 414/408 |
| 5,720,589 | 2/1998 | Christenson et al. | 414/408 |
| 5,725,348 | 3/1998 | Drake | 414/408 |
| 5,769,592 | 6/1998 | Christenson | 414/408 |

FOREIGN PATENT DOCUMENTS

| | | | |
|---|---|---|---|
| 632031 | 10/1991 | Australia | 414/408 |
| 407967 | 1/1925 | Germany | 414/486 |
| 6509716 | 1/1967 | Netherlands | 294/111 |
| 1134483 | 1/1985 | U.S.S.R. | 414/408 |
| 1379221 | 3/1988 | U.S.S.R. | 294/111 |
| 9401350 | 1/1994 | WIPO | 414/408 |

*Primary Examiner*—David A. Bucci
*Attorney, Agent, or Firm*—Marvin E. Jacobs

[57] ABSTRACT

A refuse collection system that includes a refuse container handling system stowed below a refuse storage hopper, all mounted on a vehicle. The refuse handling system includes a lift arm to raise and lower a single articulated arm and an extension arm to extend the lift arm from its stowed position to near a refuse container. The outer end of the extension arm includes a releasable clamp for engaging and clamping the container during lift and releasing the container when the arm returns it to the ground.

29 Claims, 12 Drawing Sheets

REFUSE CONTAINER HANDLING SYSTEM

TECHNICAL FIELD

The present invention relates to refuse container handling systems for use with refuse collection vehicles.

BACKGROUND OF THE INVENTION

As costs of equipment and labor increase, it is necessary to provide quick and reliable refuse collection equipment so that each vehicle in service can collect the refuse from more containers per shift. The refuse collection equipment field is particularly in need of efficient residential refuse collection where a large number of relatively small containers must be collected and dumped in short periods of time. Furthermore, in many communities recycling is becoming popular, often a requirement, thus the numbers of containers are geometrically increasing. In addition, with the increasingly high cost of labor, these collection systems must become faster and more highly automated yet simpler, robust and hazard free. The industry has responded by providing innovative improvements that increase the reliability and speed while reducing the cost of collecting refuse. Many of these developments are significant and a measure of success has been achieved.

Of the many refuse collection systems available commercially and described in the literature, each suffers at least one and often, several shortcomings. If the refuse container handling assembly of the system can handle and reposition containers not directly in line with the lifting mechanism thereby making positioning of the collection vehicle with respect to the refuse container less critical. The assemblies tend to be fragile, difficult to maintain, unreliable, and require skills not available to, or attainable by, many refuse collection vehicle operators. If the container handling assemblies are robust and rugged, they tend to lack suitable articulation and do not have sufficient flexibility for efficient container pickup. These systems tend to be heavy and bulky which typically causes them to be slow, and very importantly, they overly stress the vehicle's suspension system and occupy valuable space on the vehicle which could otherwise be devoted to payload, i.e. refuse stowage.

Cost considerations in particular present many difficulties for the design of refuse handling systems. The quest for rapid operation, leads the designer to sophisticated automated assemblies, typically using light weight components to reduce power and dynamic loading demands. Although the fabrication of the system may turn out to be inexpensive, such designs are often plagued with operational failures and breakdowns which incur wasteful, unproductive time loss for the operator and the vehicle. The design of any such system must consider not only the challenges of the refuse collection operation, but the impact of system design and operation on the operator, the vehicle systems (frame, suspension, power plant, etc.), the collection bins, hoppers, compactors and even the refuse containers. Such design optimization techniques on a true vehicle/collection wide basis are frequently overlooked or bypassed with attendant losses in economy of operations.

In summary, a very substantial need remains to have refuse collection systems, and most particularly, refuse container engaging, clamping, lifting, dumping and releasing apparatus which further reduce overall refuse collection costs and increase the safety of the operator. Often the two objectives are in conflict.

List of References

| Patent No. | Patentee |
|---|---|
| 4,227,849 | Worthington |
| 4,566,840 | Smith |
| 5,056,979 | Niederer et al |
| 5,209,537 | Smith et al |
| 5,222,853 | Holtom |
| 5,419,671 | Smith et al |
| 5,525,022 | Huntoon |

STATEMENT OF THE PRIOR ART

The relatively large number of inventions in just the past 5 years attests to the need for continued improvements in the design and operation of refuse container handling and lifting systems. The bottom line for such improvements must be two fold 1) the reduction of the overall cost of the refuse collection system and 2) reduction of the hazards attendant to the collection of refuse. The system wide aspects of the cost equation are often overlooked, such as the lost time due to equipment failures, the wear and tear on the collection vehicle caused by a less than optimized collection system design, the loss of refuse stowage volume on the vehicle resulting from bulky collection system design, etc. Safety considerations are often compromised in the pursuit of increased speed of operations and the resulting economies expected.

To adequately understand the features of a refuse container handling system, it is useful to appreciate the other critical components and operations of the entire refuse collection vehicle. To this end, in addition to the container handling system, most refuse collection vehicles have a compactor or packer and a stowage hopper. The refuse is typically first compacted by an auger, plate or piston type compressor and is then moved into a stowage hopper where it is accumulated and stored until the full load of compacted refuse can be discharged at the receiving location (recycling center, landfill, etc.)

Contemporary, high efficiency refuse collection vehicles are now operated solely by one operator who not only drives and positions the vehicle, but also operates the container handling system, usually without leaving the vehicle's cab. In such cases, of course, the handling system controls are placed within easy reach of the driver. Other less sophisticated systems require a second operator for the handling system or require the second operator to position the containers so they may be accessed by the handling system, controlled by the first operator.

Refuse container handling systems are usefully categorized by the location on the refuse collection vehicle in which the handling system is placed. The mounting and stowage location for most container handling systems is typically found immediately behind the vehicle's cab and in front of the packer and/or hopper. The handling system is less frequently placed between the packer and the stowage hopper. In some configurations, the handling system occupies portions of both sides of the hopper. Other container handling systems are secured to the top of the packer or the stowage hopper. In these configurations, heavy and complex rails and carriages are provided to bring the system into position to lift the refuse container.

For this broad variety of refuse container handling systems, a large variety of actuators, mechanisms and linkages are used to extend the system out and away from the body of the vehicle, to grip the refuse container, to raise the container into position so that it may be dumped, to dump the container contents into the stowage hopper, to lower the container to street level, and to release the container.

These systems if properly designed and fabricated, can effectively handle containers. However, they all suffer a serious shortfall in that they consume critical space on the vehicle that could otherwise be devoted to increasing payload. The ability to increase the payload, i.e. to have a greater volume of refuse in the stowage hopper, lengthens the period between which the stowage hopper must be emptied thus reducing the number of discharge cycles at the receiving station. The space required for current configurations of refuse container handling systems also forces the stowage hopper unnecessarily rearward extending the chassis of the collection vehicle and producing improper body overhang, poor weight distribution on the vehicle and instability especially during turning corners or during avoidance maneuvers. The current refuse collection methods also suffer the disadvantage of having very heavy components mounted high on the vehicle which places additional stresses and moments on the vehicle's frame and suspension system. Lateral instability is also higher in such configurations.

A typical example of the "behind cab" handling system is disclosed by Smith (U.S. Pat. No. 4,566,840) and marketed by the Heil Company, Milwaukee, Wis. This system comprises a refuse dumping system that includes a support frame with connected vertical and horizontal legs. The support frame is attached (typically welded) to the vehicle's frame immediately behind the cab transverse to the vehicle's longitudinal axis. The horizontal leg supports a lift arm via a link member. The lift arm has a container gripping means mounted on its outboard end. The motion of the lift arm is controlled by a guide track that is pivotally connected at its upper end to the horizontal leg of the frame and is engaged with the lift arm by a roller. The container is gripped, lifted and dumped through the cooperative actions of three hydraulic powered pistons acting on the above described legs, lifting arm, link member, and gripping means. Although this arrangement has enjoyed some commercial success, it falls short of making full and effective use of the space available on the collection vehicle and thus has not minimized the overall cost of the collection operation.

Another system disclosed in U.S. Pat. No. 5,525,022 also mounts behind the cab. In this system, an elongate lift arm extends longitudinally along the side of the collection vehicle. This arm is raised from a lowered position to an elevated dump position by conventional hydraulic lift means mounted above the vehicle chassis and behind the vehicle's cab. In the lowered position, the lift arm may be moved laterally away from the collection vehicle by conventional hydraulic cylinders. Guide posts are adapted to the lift arm. A hydraulically driven slide is longitudinally positioned on posts and a faceplate is pivotally mounted to the guide posts. The faceplate is specially configured to engage refuse containers. The longitudinal positioning of the slide and faceplate allows the refuse container to be dumped into either one or two receiving chambers in the collection hopper. Although this system offers some useful features, its multiple lifting, sliding and pivoting mechanisms and drives add complexity and challenge overall long term reliability of the handling system. Most importantly, valuable refuse stowage space is occupied by the hydraulically operated lift means positioned behind the vehicle's cab.

Holtom (U.S. Pat. No. 5,319,039) describes a refuse loading arm for reaching and grabbing a refuse bin from a rest position on the ground. The arm assembly is securely attached to the side of the refuse collection chamber. The arm assembly itself is comprised of pivotable parallelogram linkages with a refuse container gripping nipper. By being attached to the side of the refuse stowage chamber, the volume of stowed refuse is reduced to keep the lateral dimension of the stowage chamber plus the stored lift arm within the allowable 8 foot limit on most streets and highways.

Smith and Johnson (U.S. Pat. No. 5,419,671) describe a top mounted container handling system. In this configuration, a lift arm is mounted on top of the body of a refuse collection vehicle and terminates in a refuse container gripping mechanism. The lift arm is configured to include three four-bar linkages which interact to produce a reach and hoist cycle. Although this configuration reduces or eliminates the space required between the vehicle's cab and the stowage hopper, it results in a narrower stowage hopper to keep the lateral dimensions of the refuse collection vehicle with allowable dimensional limits of most streets and highways. The narrower hopper naturally reduces payload capacity and thus impairs cost minimization. Furthermore the top mounted handling system results in high weight distribution and excessive moment arms that can excessively stress the vehicle's chassis.

In summary, in all of the prior systems, the volume of the collection vehicle's refuse stowage capacity is reduced, unnecessary stress is added to the vehicle's chassis with resulting increased maintenance requirements and the overall cost of refuse collection operations is unnecessarily expensive.

STATEMENT OF THE INVENTION

The present invention ameliorates these shortcomings and reduces the cost of refuse collection operations. The present invention provides a refuse container handling system that maximizes the payload capacity of the refuse collection vehicle and reduces wear and tear on the vehicle and, more particularly, wear and tear on the vehicle's suspension system. This invention provides for a very compact handling system that is rugged yet lightweight. Thus designed and manufactured, the entire handling system may be efficiently stowed below the refuse storage hopper. In this fashion, no space that would otherwise be used for payload, i.e. refuse, is inefficiently used for the handling system as is common in prior systems.

Furthermore, by positioning the handling system low on the vehicle, the center of gravity of the entire vehicle is kept low which improves its stability, enhances vehicle handling performance and increases overall safety. In addition, by achieving a very low center of gravity for the vehicle, the moments and torques imparted to the vehicle during the container handling operation are minimized, consequently contributing substantially less stress to the vehicle's suspension system. By positioning the handling system below the storage hopper, maintenance needs for the vehicle are reduced and its operating life is increased. The overall net effect is to substantially reduce the cost of a refuse collection operation.

Having the handling system positioned below the hopper also permits the storage hopper to be positioned as far forward on the vehicle's chassis as possible. This positioning of the weight of the hopper and its contents is optimum for vehicle stability and operation. This also minimizes overhang at the rear of the vehicle and permits use of a lower cost, shorter wheelbase vehicle.

The presently preferred embodiment of the refuse container handling system comprises a means for mounting and stowing the handling system below the storage hopper of a refuse collection vehicle, a means for lifting and lowering a refuse container that is supported by the mounting and stowing means and further includes a lift arm and a lift ram, a means for extending and retracting the lift arm from the stowed position below the storage hopper to the proximity of a refuse container, a means for engaging and clamping a refuse container connected to the lift arm, and a means for dumping refuse into the stowage hopper.

The means for mounting and stowing consists of an elongated beam extending outwardly from the longitudinal axis of the refuse collection vehicle with the inboard end securely attached to the frame and/or other suitable structural members of the vehicle. The outboard end supports the lifting and lowering means to which is secured a horizontally disposed lift pivot assembly. A yoke pivot assembly is rotatably connected to the lift pivot assembly and the lift arm is securely attached to the yoke pivot assembly. The yoke pivot assembly, with the rigidly and fixedly attached lift arm, is caused to rotate about the lift pivot assembly by a lift ram.

The means for extending and retracting the lift arm includes an extension ram connected between the yoke pivotassembly and the lift arm. The lift arm has an inner lift arm section that is pivotally connected to an outer lift arm section. By providing pressurized hydraulic fluid to the extension ram, the lift arm is extended from its stowed or folded position, in jack-knife like fashion, to a nearly straight alignment of the inner and outer lift arm sections.

The means for engaging and clamping includes a clamping support frame pivotally attached to the outermost end of the outer lift arm section. Left and right clamp arm shafts are rotatably supported by the clamping support frame. Each shaft is connected to a clamp arm generally having a semicircular elongated configuration each arm forming an opening to cooperatively receive a refuse container. The clamp arms shafts, and thus the clamp arms, are rotated by sprocket and chain assemblies driven by a clamping ram supplied with pressurized hydraulic fluid.

The means for dumping the refuse from the container comprises a dump lever attached to the clamping support frame. The dump lever is displaced by the storage hopper as the refuse container is moved into position for dumping above the hopper. This displacement of the dump lever rotates the clamping support frame.

In operation, the lift arm is extended outwardly from its stowed position below the hopper towards the refuse container by providing pressurized hydraulic fluid to the extension ram. This action causes both inner and outer sections of the lift arm to unfold and extend away from the longitudinal axis of the refuse collection vehicle. When the engaging and clamping means at the end of the outer lift arm is in the immediate vicinity of the refuse container, pressurized hydraulic fluid is provided to the clamping ram which causes the clamp arms to move from their vertical, stowed position to a horizontal position with the clamp arm openings facing each other with the refuse container between the openings. Continued operation of the clamping ram causes the clamp arms to firmly grip the container.

When the container is firmly gripped, pressurized hydraulic fluid is provided to the lift ram which then rotates the yoke pivot assembly about the lift pivot assembly thus elevating the lift arm and moving the refuse container into position for dumping. As the lift arm reaches the storage hopper, the dump lever is displaced by the side of the hopper which then rotates the clamping support frame and thus the container so that the refuse is deposited in the hopper by gravity.

A particularly useful feature of the preferred embodiment of this invention are two guidebars, the lift arm guidebar and the clamp arm guidebar. Both uniquely control the motion of critical components of the system. These are passive, unpowered components, however in their absence, additional active powered actuators would be required to accomplish the same functions. One end of the lift arm guidebar is pivotally connected to a lift arm guidebar bracket connected to both the lift pivot assembly and the yoke pivot assembly. The second end of the lift arm guidebar is connected to the outer section of the lift arm on a short extension just beyond the pivot connection with the inner arm. The attachment points of the lift arm guidebar are selected such that as the lift arm is extended by the extension ram acting on the inner arm, the movement of both the inner and outer lift arms prescribes a precise, predetermined path. Because of the unique connection point of the lift arm guidebar to its bracket, and thus the lift and yoke pivot assemblies, and the lift arm, the guidebar continues to effectively function during the process of lifting and lowering the container.

The second guidebar controls the orientation of the engaging and clamping means, and more particularly the clamp arms. The specific purpose of the clamp arm guidebar is to cause the orientation of the clamp arms to always be parallel to the longitudinal axis of the vehicle. Thus, from its stowed position under the storage hopper, to the maximum extension of the lift arm, whether positioned for engaging the container or raised for dumping, the clamp arms are always facing outward properly oriented to handle the refuse container for engagement and clamping, dumping and disengagement. Furthermore, in the stowed position the clamp arms are positioned so the overall width of the vehicle/handling system combination is minimized to meet the governmental highway standards.

The unique positional control provided by the clamp arm guidebar is achieved by pivotally connecting one end to a short stub extending from the pivot connection between the inner and outer lift arm sections and pivotally connecting the other end to the clamping support frame. The attachment points are selected such that the parallel orientation of the clamp arms is maintained through out the complete extension of the lift arm, in either the raised or lowered position.

A particularly unique feature of this invention is the engaging and clamping means. By this means, several potentially complex motions and functions are integrated and simplified. The mechanism that serves this purpose is operated by a single hydraulic powered clamping ram and is comprised of two sections, one a mirror image of the other. To best understand this mechanism, first consider only one of the sections. A near semicircular clamping arm is mounted at an oblique angle to a clamp arm shaft that is rotatably supported by the clamping support frame. The shaft has two sprockets, mounted one above the other, and each sprocket has teeth to engage a pair of drive chains. The drive chains are wrapped around their respective sprockets for less than a full turn. The chains are wrapped in opposite directions, that is one is wrapped clockwise, the other counter-clockwise. One end of each chain is firmly secured to its respective sprocket. The other ends are secured to a carriage moved by the clamping ram piston rod. Thus connected, as the ram is extended, the chains cooperate, one by winding around its sprocket, the other my unwinding from its sprocket, and thus causing the clamp arm shaft with the attached clamp arm to rotate. The oblique angle of the mounting of the clamp arm to the shaft, causes the clamp arm to rotate from a vertical position to a horizontal position. Chains, such as those used to provide power to the drive wheel of a motorcycle, were selected for this purpose after experimentation with alternative means, such as cables and gear trains. Several scale models of the apparatus were also used to identify and test preferred configurations and component selections. The chains were thus determined to be most robust, more readily maintained, and if repair was necessary, most easily accomplished.

Now, if the mirror image of this half of the mechanism is considered, it is straightforward to visualize the pair of clamp arms responding to an extension of the ram, both arms starting in a vertical position, open sections of the semicircular openings facing away from each other, to a horizontal position with the clamp arm openings facing each other, and thereby cooperatively engaging and clamping a refuse container. Return of the clamping ram to its initial position causes the opposite rotation of the clamp arm shafts thus disengaging the container and returning the clamp arms to their vertical stowed positions.

Another unique feature of this invention is the incorporation of two deceleration valves, one to control the elevation of the lift arm and the second to control its lowering. These valves control the supply of pressurized hydraulic fluid to the cylinder and piston portions of the lift ram. By use of these valves, the rate of lifting and lowering may be substantially increased over the majority of the movement of the lift arm and by having the appropriate deceleration valve activated just before the arm reaches either its upper or lower limit, the flow of hydraulic fluid is restricted, thus decelerating the motion of the arm in a precisely defined manner. Consequently the speed of the operation is maximized, the motion of the lift arm is smooth and controlled so that the refuse can be properly dumped, and the dynamic forces on the refuse handling system and collection vehicle are minimized. Each of these features substantially reduces downtime, reduces cost of maintenance and extends the useful operational life of both the handling system and the vehicle.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
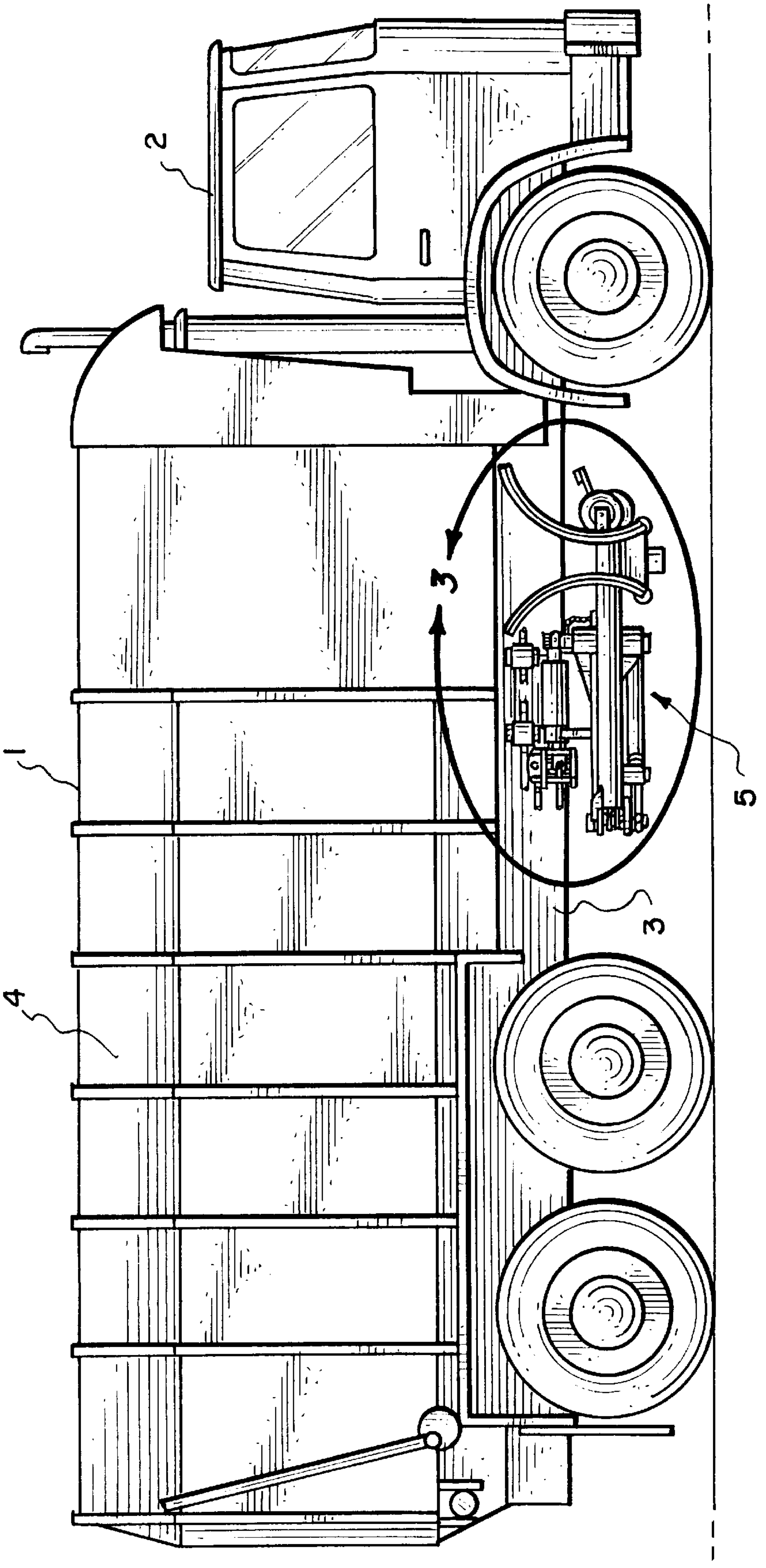
FIG. 1 is a side view in elevation of a refuse collection vehicle with the refuse container handling system shown in the stowed position.

Referring now to FIG. 1 a refuse collection vehicle 1 is shown with an operator cab 2, frame members 3 and a refuse storage hopper 4 secured to the frame members 3. The hopper 4 is positioned well forward on the vehicle 1 and immediately behind the operator cab 2. FIG. 1 also shows an embodiment of the refuse container handling system 5, preferably stowed below the hopper 4 and secured to the frame members 3 of the vehicle 1.

Figure 2:
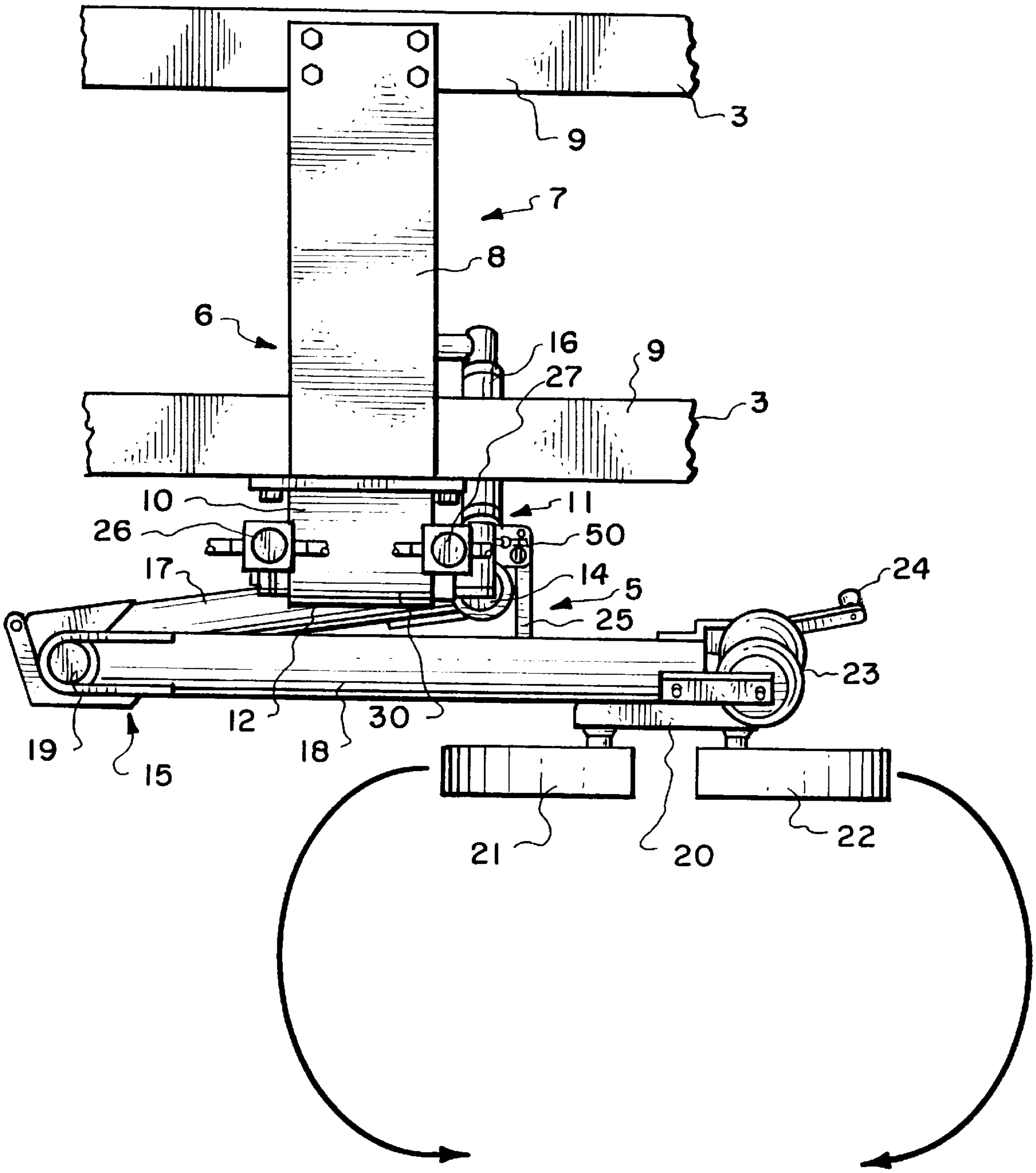
FIG. 2 is a plan view of the refuse container handling system in its stowed position shown mounted to the frame of the refuse collection vehicle.

FIG. 2 provides more details of the container handling system 5 and its means for mounting and stowing 6 the handling system 5 on the vehicle 1. FIG. 2 shows the mounting and stowing means 6 connected to a typical vehicle 1 which has two, substantially parallel frame members 3. The means for mounting and stowing 6 comprises an elongated substantially rectangular beam 7 attached transversely to the vehicle's frame members 3. In the preferred embodiment, the vehicle attachment portion 8 of the beam is rigidly and securely connected to the upper side 9 of the frame members 3. The beam 7 is secured to the frame members 3 by any of several known attachment methods, most typically by welding but bolting and riveting may be acceptable options. The rectangular beam 7 is preferably formed from a solid, high strength steel alloy although other configurations and materials of similar strength may be used. As required for the particular vehicle on which the handling system 5 is to be mounted, side plates, gussets, braces, brackets and the like are added to best adapt the mounting and stowing means 6 to the vehicle. It is also acceptable for the mounting and stowage means 6 to be attached to other portions of the frame members 3 or to other structural members of the vehicle 1.

Figure 3:
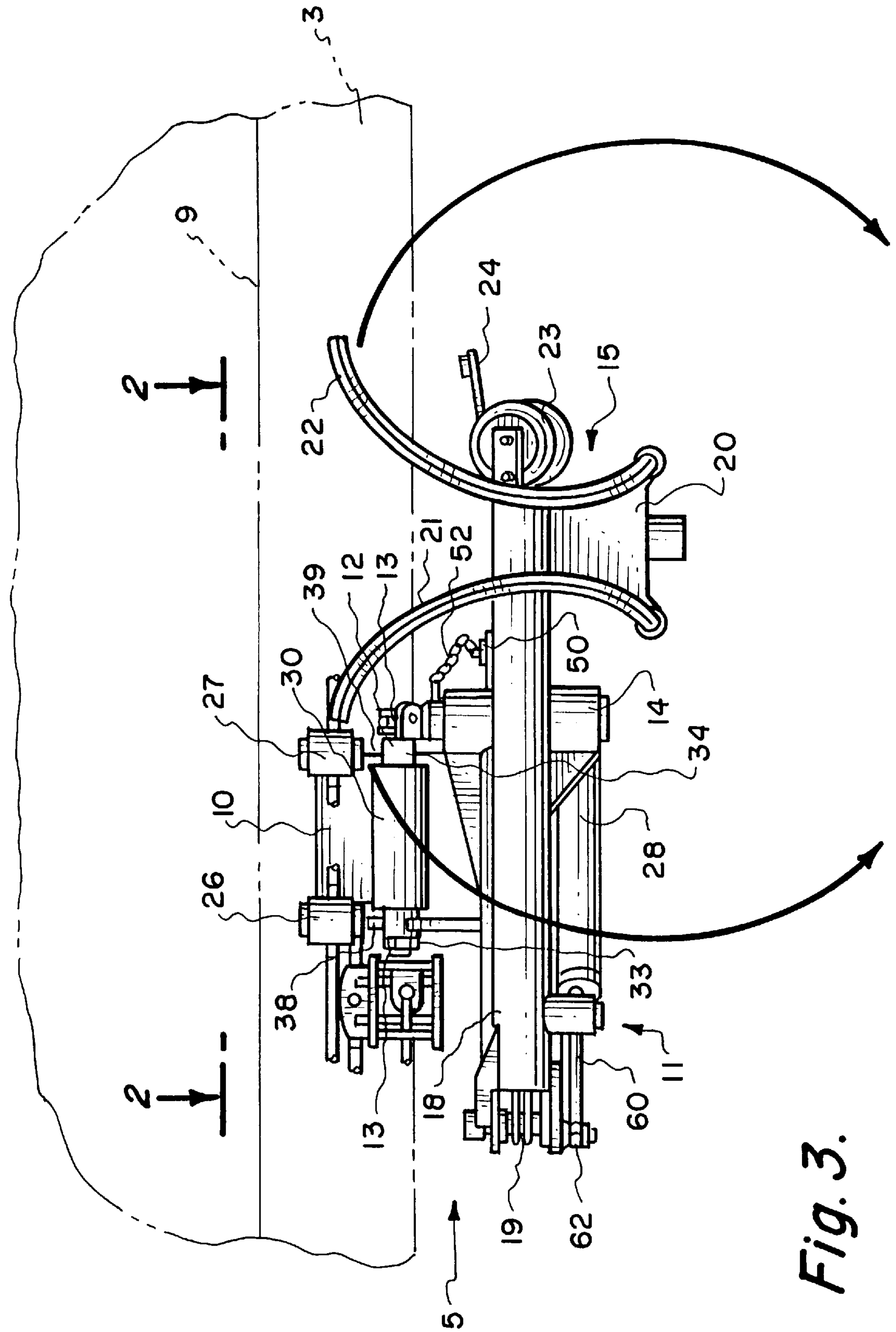
FIG. 3 is a view in elevation of the refuse container handling system in its stowed position.

FIG. 3 shows the vertical spacial relationships between the elements of the handling system 5 and the vehicle 1. Referring now to FIG. 3, in conjunction with FIG. 2, the mounting and stowing means 6 includes an outboard end portion 10 that extends outwardly from the longitudinal axis of the refuse collection vehicle 1 and downwardly from the vehicle attachment portion 8. The lifting and lowering means 11 is fixedly and securely attached to the outboard end portion 10 of the mounting and stowing means 6 and includes the horizontally disposed lift pivot assembly 12 and its lift pivot pin 13, the yoke pivot assembly 14 which is rotatably attached to the lift pivot pin 13, and the lift arm 15.

Figure 4:
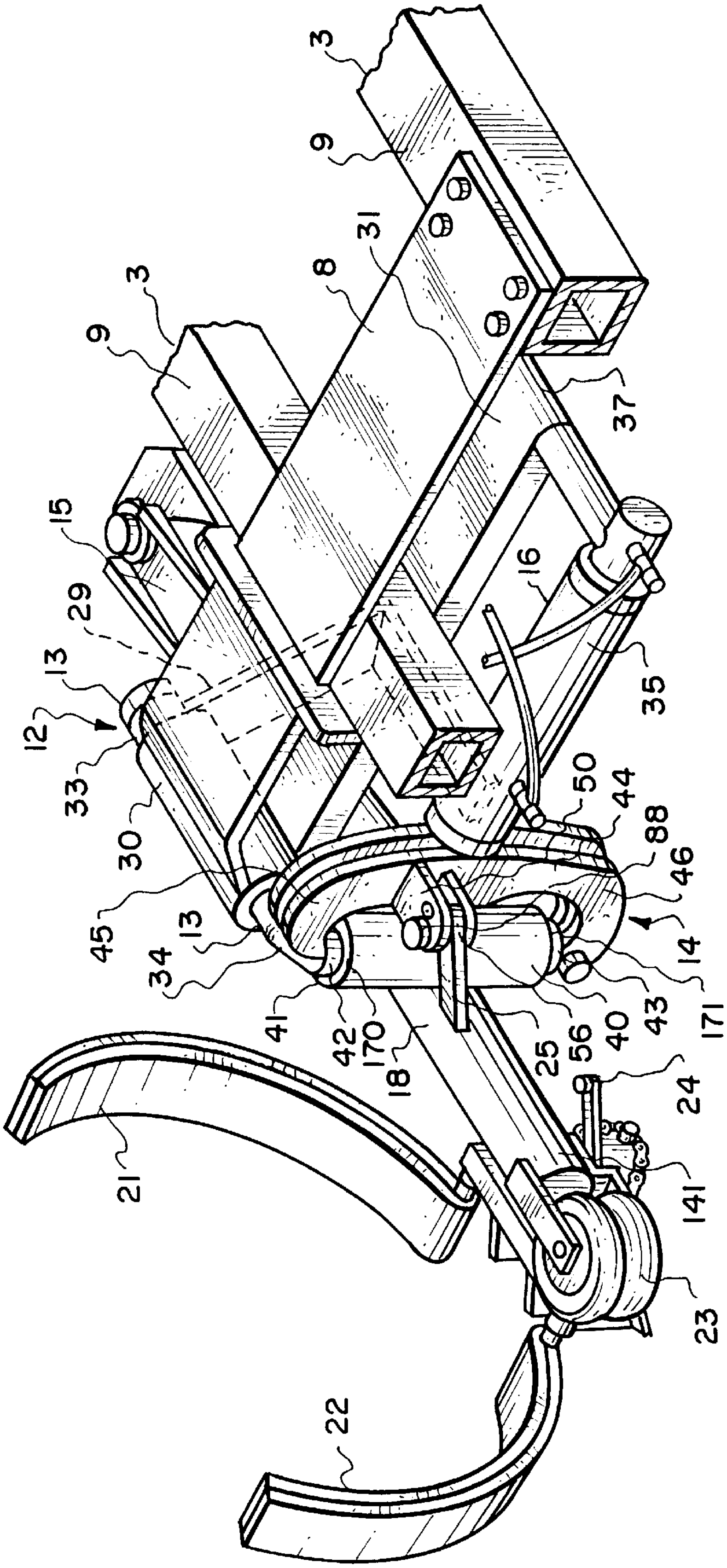
FIG. 4 is a perspective view of the key elements of the refuse container handling system shown in its stowed position mounted to the frame of a vehicle.

FIG. 4 in conjunction with FIG. 2 and FIG. 3, shows the lift ram 16 connected between the lift ram anchor beam 31 and the yoke pivot assembly 14, the inner lift arm section 17 and the outer lift arm section 18 of the lift arm 15 pivotally connected by a elbow pivot pin 19. Other features of the refuse container handling system 5 shown in FIGS. 2, 3 and 4 include the clamping support frame 20, the left clamp arm 21, the right clamp arm 22, the shock absorber means 23, the dump lever 24, the first locking bracket 25, the second locking bracket 50 and the first deceleration valve 26, and the second deceleration valve 27. The interconnection, purpose and functions of these and other features will be fully described and further illustrated in subsequent figures and paragraphs.

FIG. 4 further illustrates the detailed arrangement and connections of the mounting and stowing means, the lift pivot assembly 12, the yoke pivot assembly 14, and the lift arm guidebar bracket 29. The housing of the lift pivot pin 30 is securely welded to the outboard end portion 10 of the mounting and stowing means 6. The lift ram anchor beam 31 is securely welded orthogonally to the axis of the lift pivot assembly housing 30 and extends to its distal end 37 downwardly and inwardly towards the longitudinal axis of the refuse collection vehicle 1. The lift pivot housing 30 has two internal lift pivot pin bearings (not shown) supporting the lift pivot pin 13. Preferably the lift pivot pin bearings are adapted from heavy duty truck wheel bearings. Referring now to FIG. 4, further details of the yoke pivot assembly 14 are illustrated. The assembly 14 has a housing 40 with two internal bearings (not shown) supporting a yoke pivot pin 41 with first end 42 and second end 43. Preferably, the yoke pivot pin bearings are heavy duty spherical wheel bearings. The lift pivot pin housing 30 and yoke pivot housing 40 preferably are filled with oil to lubricate the bearings.

FIG. 4 also shows that yoke 44 has an upper horn 45 and a lower horn 46 between which the yoke pivot pin 41 is fixedly disposed. The upper horn 45 is securely and fixedly connected to the first end 42 of the yoke pivot pin 41 and the lower horn 46 is securely and fixedly connected to the second end 43 of the yoke pivot pin 41. In addition the upper horn 45 is rigidly and fixedly attached orthogonally to the second end 34 of the lift pivot pin 13. All of the rigid and fixed connections described above are preferably welded but may be accomplished by bolting or any other substantial attachment means.

Figure 5:
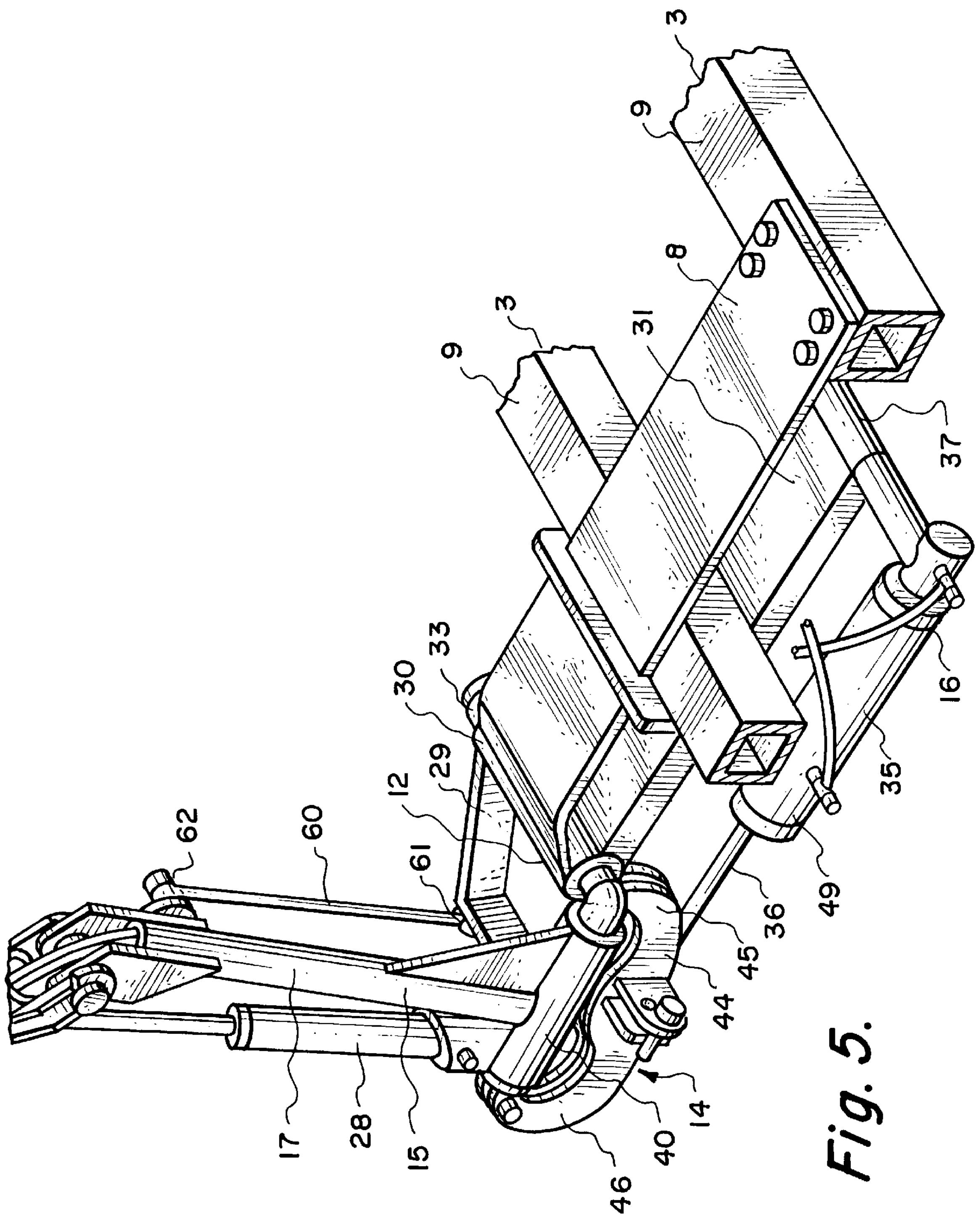
FIG. 5 is a perspective view of the key elements of the refuse container handling system after the lift arm has been raised.

The cylinder portion 35 of the lift ram 16, shown in FIG. 4 and FIG. 5, is pivotally connected to the distal end 37 of the lift ram anchor beam 31 and the piston rod 36 is pivotally connected to the yoke 44 midway between the upper horn 45 and the lower horn 46. By referring to FIG. 4 then to FIG. 5, the action of the lift ram 16 on the yoke 44 and the lift arm 15 is clearly understood. The lift arm guidebar bracket 29 is securely attached to the first end 33 of the lift pivot pin 13 and the second end 43 of the yoke pivot pin 41. Thus connected, the lift arm guidebar bracket 29 moves in concert with the yoke pivot assembly 14 when it rotates on the lift pivot pin 13. FIG. 5 also shows the lift arm 15 being rigidly and orthogonally attached to the yoke pivot pin housing 40.

A locking means is also provided to lock the lift arm 15. As shown in FIG. 4, the locking means 56 comprises a first locking bracket 25 attached to the outer lift arm section 18 proximate to its clamp end 141 and a second locking bracket 50 attached to the yoke. Both brackets 25, 50 have apertures for receiving the locking pin 88. The pin 88, typically made of high strength steel, is flexibly attached to the yoke 44 or other convenient nearby position, see FIG. 3. The flexible attachment of the pin is accomplished with a short length of small chain 52 or other suitable durable connecting link. When the lift arm 15 is returned to its stowed position, the apertures in both brackets 25, 50 become aligned permitting the pin 88 to placed though the apertures. The lift arm 15 is thus prevented from being extended without first removing the pin 88. The pin 88 is flexibly attached 52 to the yoke, or other convenient location, so that is remains readily accessible for the locking operation, yet would not be lost nor misplaced when not in use. This locking means 56 prevents the extension of the lift arm 15 thus eliminating the potential for damage to the lift arm 15 or to other objects by inadvertently attempting to extend the lift arm 15.

Figure 6:
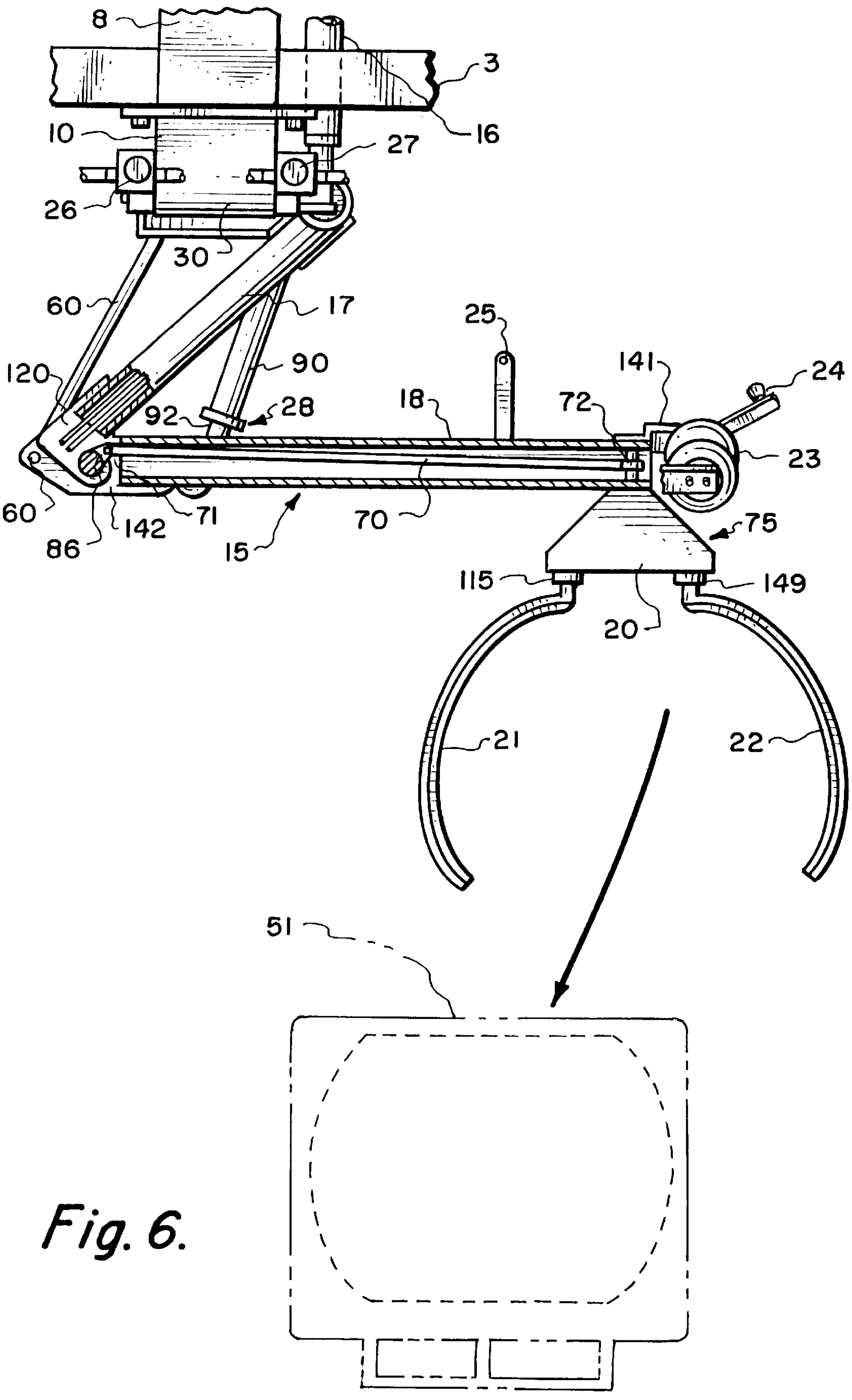
FIG. 6 is a plan view showing the lift arm partially extended by the extension ram and the clamp arms rotated to their horizontal position ready for clamping a refuse container.
Figure 7:
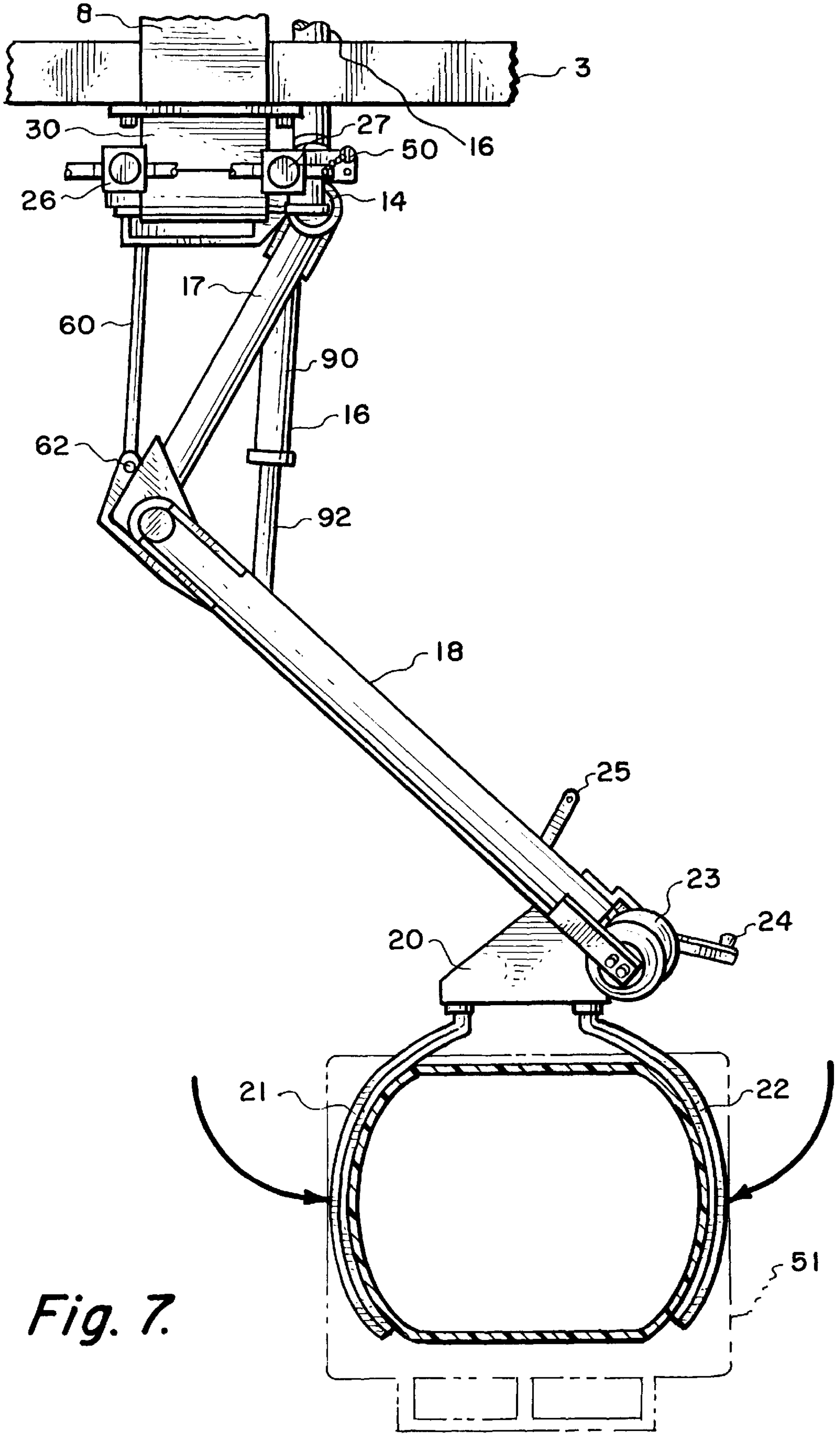
FIG. 7 is a plan view showing a near fully extended lift arm with the clamp arms having engaged a refuse container.

FIG. 6 shows the refuse container handling system 5 with the extension ram piston rod 92 partially extended in preparation for engaging, clamping and then lifting a refuse container 51. FIG. 7 shows the refuse container handling system 5 after the container 51 is in the grasp of the clamp arms, 21,22 in preparation for lifting. The unfolding of the inner and outer lift arm sections 17,18 from their stowed position is clearly shown. In the preferred embodiment of this invention, both inner lift arm section 17 and the outer lift arm section 18 are fabricated from high strength, heavy wall, tubular steel. A particularly useful material for this purpose is Shelby™ tubing.

FIGS. 5, 6 and 7 also introduce and depict the lift arm guidebar 60. The first end 61 of the lift arm guidebar is pivotally attached to the lift arm guidebar bracket 29 and the second end 62 of the lift arm guidebar is pivotally connected to the outer lift arm section 18 in proximity to its pivot end 142. The lift arm guidebar 60 is preferably formed from a solid steel rod although other materials and cross-sections may be substituted. The attachment points of the lift arm guide bar 60 are selected such that as the lift arm 15 is extended, the movement of both the inner lift arm section 17 and the outer lift arm section 18 prescribe a precise, predetermined path.

In the preferred embodiment as shown in FIG. 6, the clamp arm guidebar 70 is fully contained within the internal axial bore 9 of the outer lift arm section 18. The clamp arm guidebar first end 71 is connected to the elbow pivot stub link 86 which is attached to the lift arm inner section 17 at its pivot end 120. The second end 72 of the clamp arm guidebar is pivotally attached to the clamp arm support frame 20 as will be described more fully later. Not shown is an alternate arrangement where the clamp arm guidebar 70 is connected external to the outer lift arm section. The clamp arm guidebar 70 is preferably formed from a solid steel rod although other materials and cross-sections may be suitable. The connections of the ends 71, 72 of the clamp arm guidebar 70 are positioned such that during the full extension and retraction of the lift arm 15, the orientation of the clamp arms 21, 22 is maintained parallel to the longitudinal axis of the refuse collection vehicle 1. Referring to FIGS. 6 and 7 in sequence clearly show the effect of the clamp arm guidebar 70 in maintaining the parallel orientation of the clamp arms 21, 22.

Figure 8A:
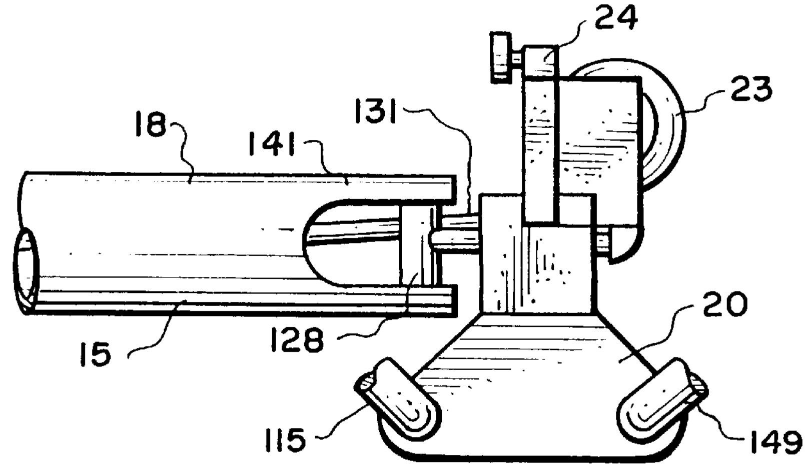
FIG. 8*a* is a plan view of the pivotal connection between the clamping support frame to the outer lift arm.

FIG. 8*a*, shows the specific details of the clamping support frame 20 pivotally connected to the outer lift arm section 18 with the support frame 20 biased to its normal position by the shock absorbing means 23. The shock absorber means 23, in the preferred embodiment, is a gas filled elastomeric bladder. Conventional springs, compliant rubber dampers, fluid or gas filled shock absorbers and other similar device are also acceptable substitutes. FIG. 8*a* also depicts portions of the left clamp arm shaft 115 and the right clamp arm shaft 149 as they are rotatably mounted by the clamping support frame 20. The support for these shafts is provided preferably by ball bearings but roller bearings, and lubricated bushings are acceptable (not shown).

Figure 8B:
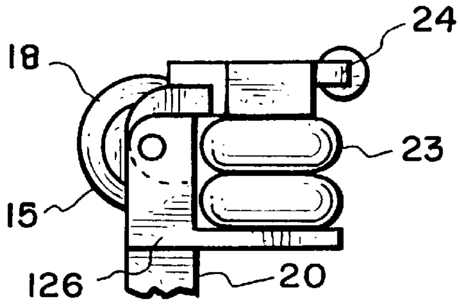
FIG. 8*b* is a view in elevation of the assembly of the clamping support and shock absorber.
Figure 8C:
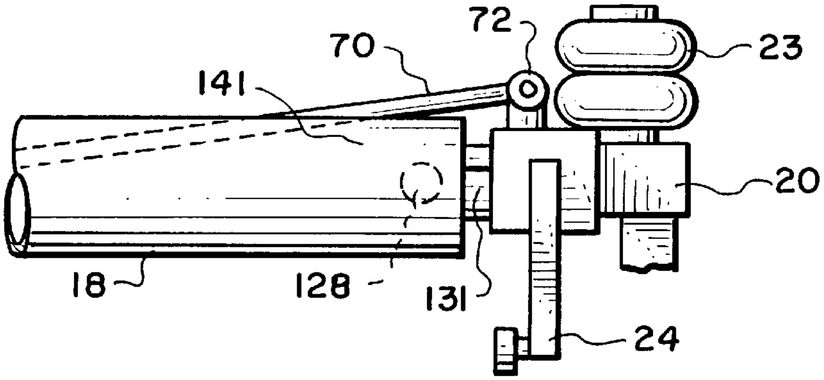
FIG. 8*c* is a further view in elevation of the assembly illustrating the dump lever.

FIGS. 8*b* and 8*c* provides additional detail of the clamping support frame 20 and its pivotable connection to the lift arm outer section 18. The clamp end pivot 128 is rotatably connected between the walls of the clamp end 141 of the lift arm outer section 18. The clamp end pivot 128 has a perpendicular extension 131 which passes through the clamping support frame 20 and is rigidly attached to the shock absorbing means bracket 126. The clamping support frame 20 is free to rotate about the perpendicular extension 131 of the clamp end pivot 128. The dump lever 24 is rigidly attached to the clamping support frame 20. The shock absorbing means 23 is disposed between the shock absorbing means bracket 126, and thus the lift arm outer section 18, and the clamping support frame 20, as shown in FIG. 8*b*. FIG. 8*c* also depicts the connection of the second end 72 of the clamp arm guidebar 70 to the clamping support frame 20.

Figure 9:
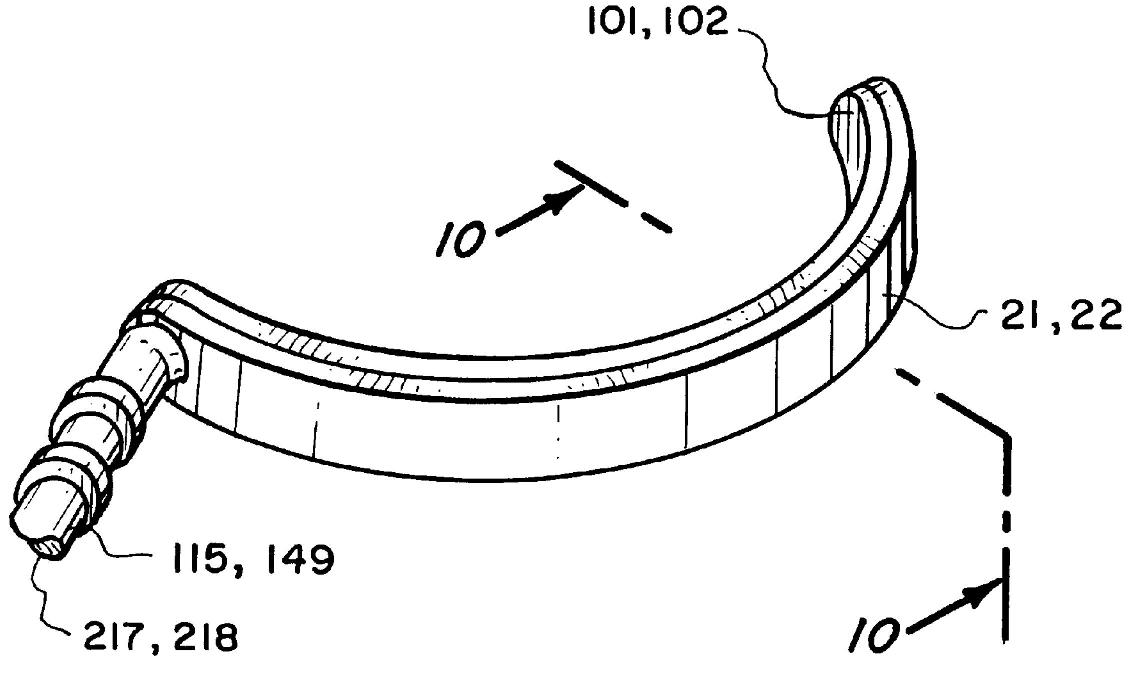
FIG. 9 is a perspective view showing a clamp arm and its oblique attachment to the clamp arm shaft.
Figure 10:
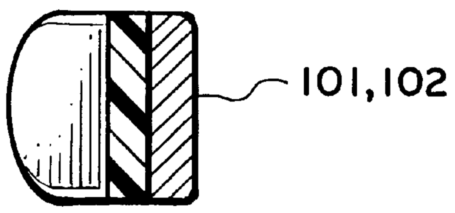
FIG. 10 is a view in section taken along line 10—10 of FIG. 9 showing a section of a clamp arm and its lining.

FIG. 9 identifies the axes 217, 218 of each clamp arm shaft and shows how each shaft 115, 149 is connected at an oblique angle, to the respective clamp arm 21, 22 each of which has a generally semicircular elongated configuration forming an opening to cooperatively receive a refuse container. High strength steel is preferable as a material from which to fabricate the clamp arm shafts 115, 149 and the clamp arms 21, 22. However, the clamp arms 21, 22 may be fabricated from steel with a strength less that required for the clamp arm shafts 115, 149. The length and opening size of the clamp arms 21, 22 are selected for compatibility with the refuse containers to be handled. The width of the clamp arms 21, 22 is not critical except that it must be sufficient to provide adequate strength to lift the containers. In the preferred embodiment both clamp arms 21, 22, as shown in FIG. 10, are lined on their interior surface with a durable, resilient material 101, 102 for enhancing the gripping action of the clamp arms 21, 22, minimizing potential damage to the refuse container and reducing the noise associated with handling metal refuse containers.

Figure 11:
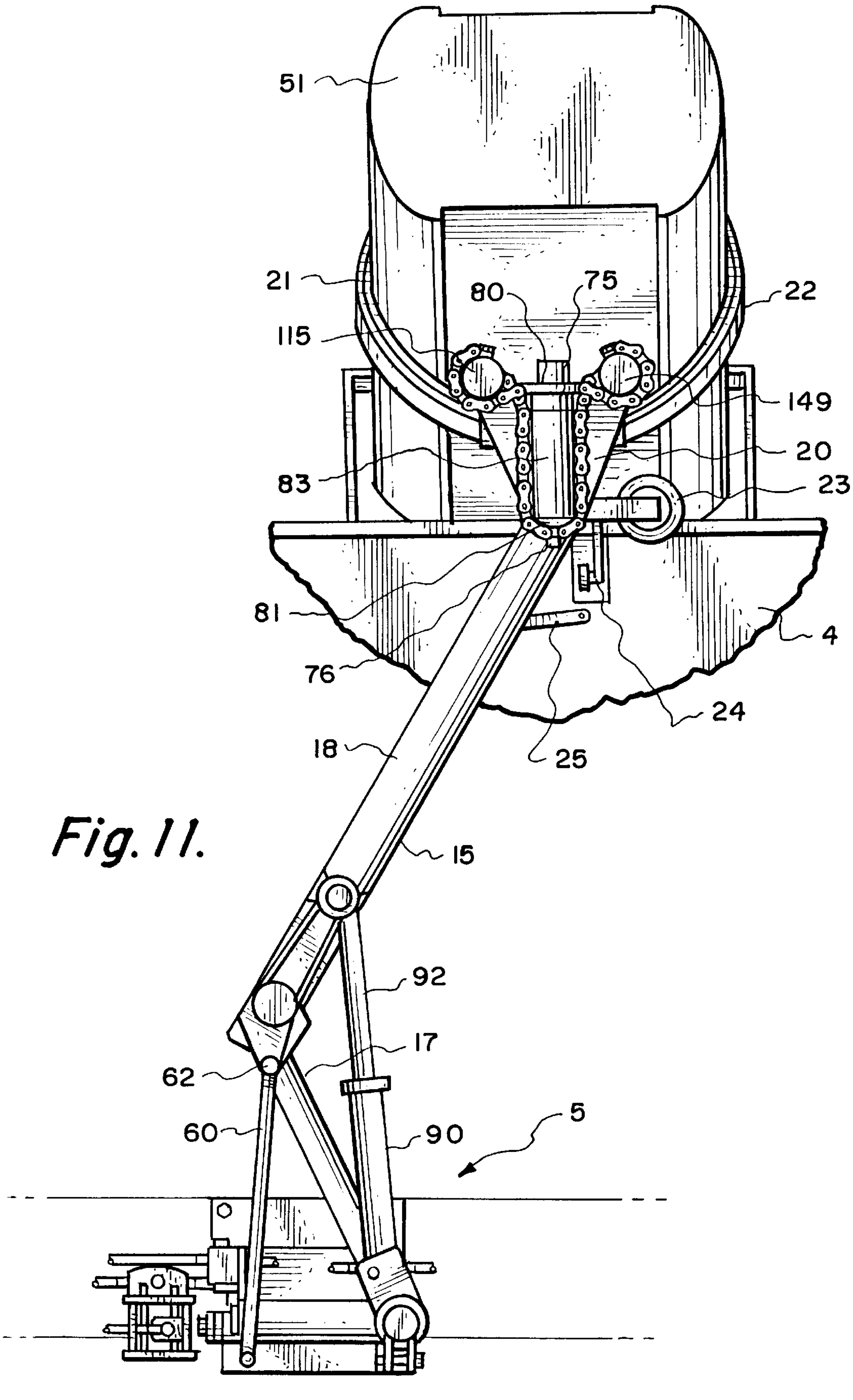
FIG. 11 is a side view in elevation of the refuse container handling system with the lift arm fully extended and the container in position ready for dumping its contents of refuse.

FIG. 11 shows the container 51 in its ultimate raised and tilted position where the refuse is being emptied into the storage hopper 4. FIG. 11 further shows the clamping support frame 20 and the components of the engaging and clamping means 75 in relation to the other elements of the refuse container handling system 5.

Referring again to FIG. 11, the clamp arm shafts 115, 149, and thus the clamp arms 21, 22, are shown to be rotated by sprocket and chain assemblies driven by the clamping ram 83. A detailed description of these components and their operation follows. In the preferred embodiment, the sprockets and chains are similar to those found for operating the drive wheel of a motorcycle. As shown in FIG. 11, the clamping ram 83 is securely attached to the clamping support frame 20 and a piston rod 76 is fitted to a carriage 80.

Figure 13:
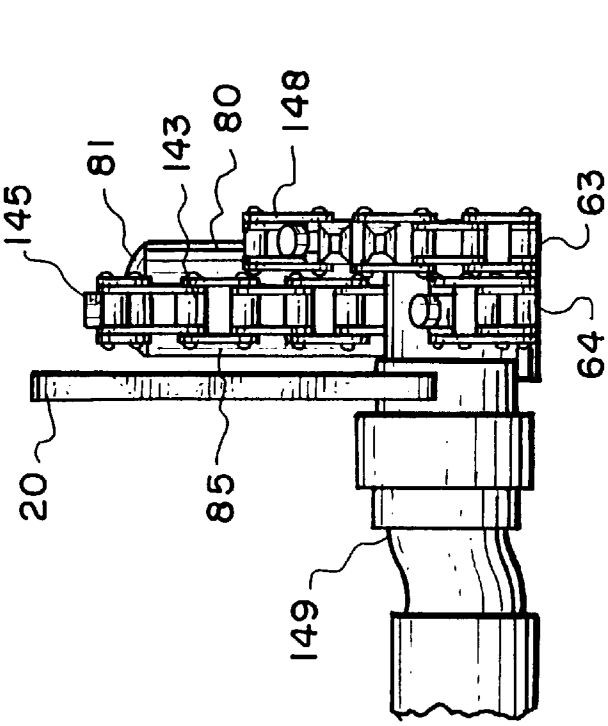
FIG. 13 is a view in elevation of the right side of the assembly for engaging and clamping a container and the arrangement of the clamping ram, clamp arm shafts, sprockets and chains before it has gripped a refuse container.
Figure 12:
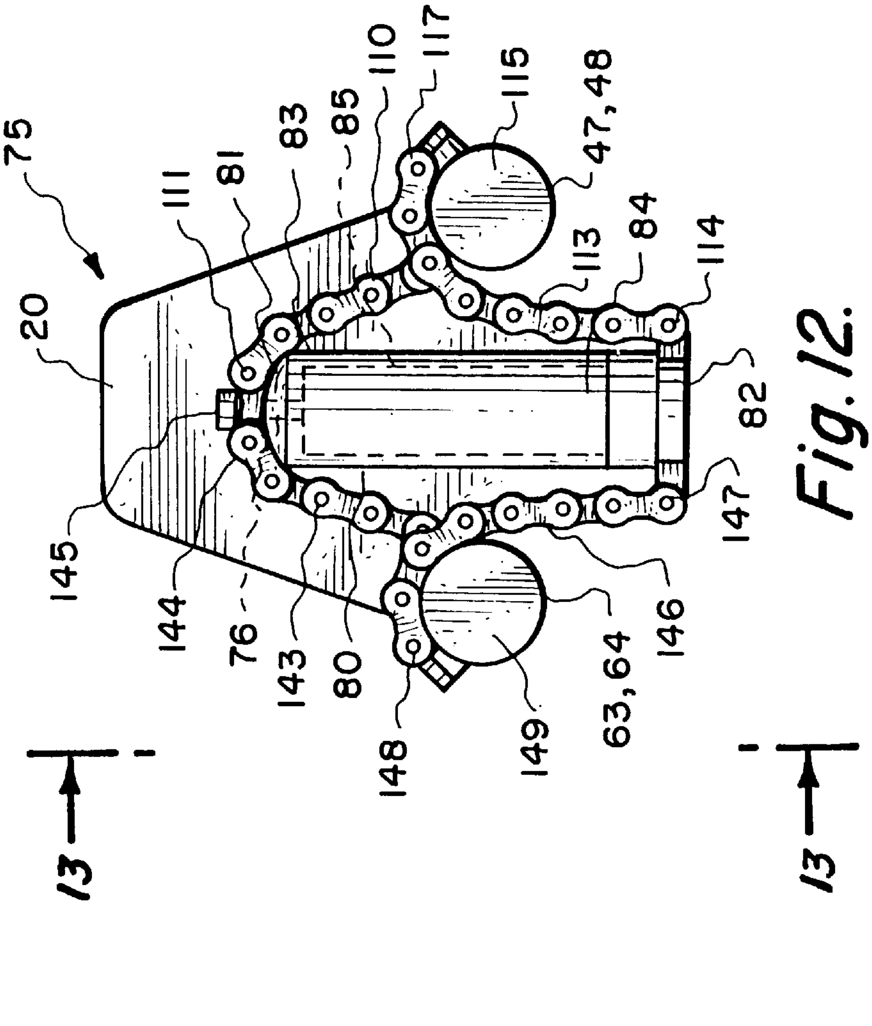
FIG. 12 is a bottom plan view of an assembly for engaging and clamping a container and the arrangement of the clamping ram, clamp arm shafts, sprockets and chains before it has gripped a refuse container.

Substantial additional details of the clamping and engaging means is shown in FIGS. 12 and 13. Both FIGS. 12 and 13 depict the clamping and engaging means prior to clamping a refuse container. The clamping and engaging means include a left pair of chain sprockets 47, 48 and a right pair of chain sprockets 63, 64, each sprocket having teeth. The left pair of sprockets 47 (shown), 48 (not shown, hidden by the left lower sprocket 47) are fixedly and securely attached to the left clamp arm shaft 115. The right pair of sprockets 63, 64 are fixedly and securely attached to the right clamp arm shaft 149. There are four clamp arm chains 110, 113, 143, 146 each being attached to the carriage 80. Carriage 80 is a longitudinal section of a right circular cylinder and is cradled under the clamping ram 83. Clamping ram 83 is fixedly and securely attached to the clamping support frame 20. As such, the carriage 80 is free to translate in response to the clamping ram piston rod 76. Each of the four chains 110, 113, 143, 146 is engaged with the teeth of their cooperating and respective sprockets as follows.

1) The left clamp arm closing chain 110 has its first end 111 securely attached to the first end 81 of the carriage 80 and passing counterclockwise substantially around and engaging the teeth of the left upper chain sprocket 48. The left closing chain 110 further has a second end 112 securely attached to the left upper chain sprocket 48.

2) The right clamp arm closing chain 143 has a first end 144 securely attached to the first end 81 of the carriage 80 and passing clockwise substantially around and engaging the teeth of the right upper chain sprocket 64. The right closing chain 143 further has a second end 145 securely attached to the right upper chain sprocket 64.

3) The left clamp arm opening chain 113 has a first end 114 securely attached to the second end 82 of the carriage 80, the left opening chain 113 passing clockwise substantially around and engaging the teeth of the left lower chain sprocket 47. The left opening chain 113 further has a second end 117 securely attached to the left lower chain sprocket 47.

4) The right clamp arm opening chain 146 has a first end 147 securely attached to the second end of the carriage 82, the right opening chain 146 passing clockwise substantially around and engaging the teeth of the right lower chain sprocket 63. The right opening chain 146 further has a second end 148 securely attached to the right lower chain sprocket 63.

A means is also provided in the preferred embodiment by which the chains may be tensioned to reduce deadbands or play in the chain drive mechanisms. Several methods for accomplishing this will be known and understood by those skilled in the art. In the preferred embodiment a small radial bore is placed in each sprocket into which a spring is placed which biases a tensioning shoe bearing on each chain. Alternatively, four separately mounted hydraulic tensioners may be used which are fixedly attached to the clamping support frame and bear against the four chains through lubricated shoes, roller bearing assembly, or other low friction interfaces between the tensioner and the chain.

The subsequent discussion will make reference to pressurized hydraulic fluid the source and controls of which are not illustrated or described since those skilled in the art will be conversant with these methods and related implementing apparatus.

The following sections describe in detail the operation of the refuse container handling system 5 and all of its elements. Referring now to FIG. 6, the lift arm 15, comprising inner section 17 and outer section 18, is extended outwardly from its stowed position below the hopper 4 (FIG. 1) towards the refuse container 51 by providing pressurized hydraulic fluid to the cylinder portion 90 of the extension ram 28. The advancement of the extension ram piston rod 92 combined with the controlling action of the lift arm guidebar 60 connecting the lift pivot assembly 12 with the outer lift arm section 18 at its pivot end 142, causes both the inner lift arm section 17 and the outer lift arm section 18 to pivot about the elbow pivot pin 19 in a precise, controlled and repeatable relationship with respect to each other.

As the lift arm 15 is advanced by the extension ram 28, the clamp arm guidebar 70, connecting the inner lift arm section 17 at its pivot end via the elbow pivot stub link 86 to the clamping support frame 20, controls the orientation of the engaging and clamping means 75, and more particularly the clamp arms 21,22. The specific purpose of the clamp arm guidebar 70 is to cause the orientation of the clamp arms 21, 22 to always remain parallel to the longitudinal axis of the refuse collection vehicle. Thus, from its stowed position under the storage hopper FIG. 2, to intermediate extended positions as shown in FIGS. 6 and 7, and to the maximum extension of the lift arm 15 as shown in FIG. 11, whether positioned for engaging the container 51 or raised for dumping (FIG. 11) the clamp arms 21, 22 always face outward after the clamping ram 83 is actuated. Thus the clamp arms 21, 22 are always properly oriented to engage and clamp the refuse container 51.

Referring again to FIG. 6, the unique positional control provided by the clamp arm guidebar 70 is achieved by pivotally connecting the first end of the clamp arm guidebar 70 to the elbow pivot stub link 86 extending from the pivot end 120 of the lift arm inner section 17. The second end 72 of the clamp arm guidebar 70 is pivotally connected to the clamping support frame 20 as shown in FIG. 8C. The attachment points of the clamp arm guidebar 70 are selected such that the parallel orientation of the clamp arms 21, 22 is maintained throughout the complete extension of the lift arm 15, in either the raised or lowered position.

Figure 15:
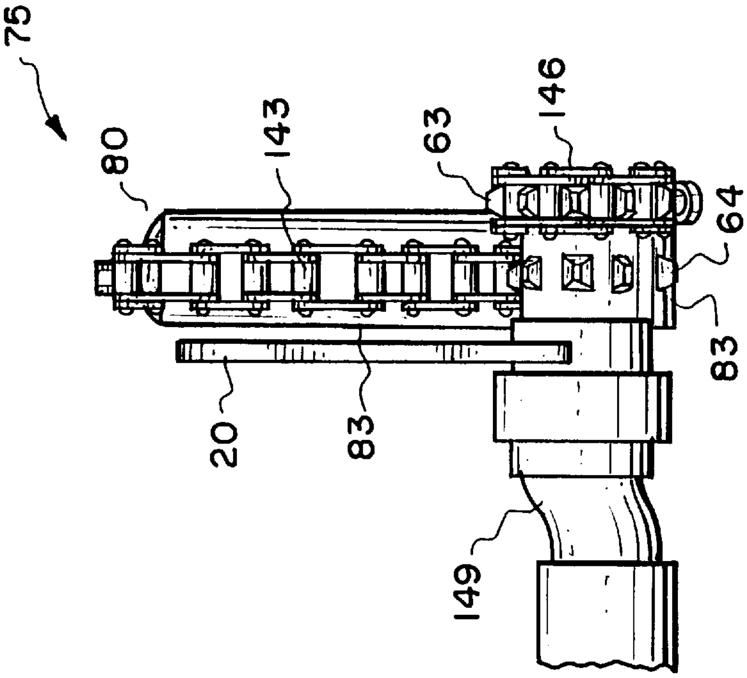
FIG. 15 is a view in elevation of the right side of the assembly for engaging and clamping a container and the arrangement of the clamping ram, clamp arm shafts, sprockets and chains after it has clamped a refuse container.
Figure 14:
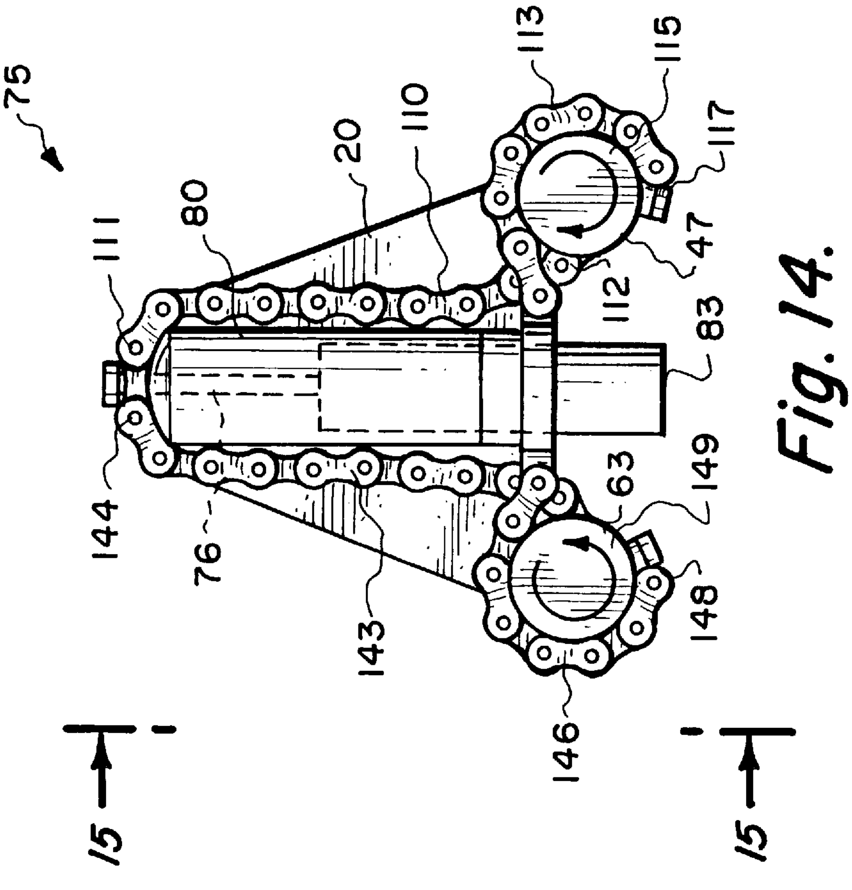
FIG. 14 is a plan view of the assembly for engaging and clamping a container and the arrangement of the clamping ram, clamp arm shafts, sprockets and chains after it has clamped a refuse container.

Referring now to FIGS. 12 and 13, as the lift arm is advanced towards the immediate vicinity of a refuse container, pressurized hydraulic fluid is provided to the cylinder portion 84 of the clamping ram 83 which advances the clamping ram piston rod 76 and the carriage 80. The clamping and engaging means 75 is shown in FIGS. 14 and 15 after the clamping ram piston rod 76 has advanced the carriage 80 to its full translation distance at which point the refuse container is firmly clamped. As the piston rod 76 advances the carriage 80, the left opening chain 110, is placed in tension and is advanced causing the left clamp arm shaft 115, via the action of chain 110 acting on the left upper sprocket 48, to rotate clockwise (as shown in FIGS. 12–15). Simultaneously, as the piston rod 76 advances the carriage 80, the right opening chain 143 is placed in tension and is advanced thus causing the right clamp arm shaft 149, via the action of chain 143 acting on the right upper sprocket 64, to rotate counterclockwise. At the same time, as the piston rod 76 and the carriage 80 are advanced, the left closing chain 113 is caused to wrap around the left lower sprocket 47 as the left clamp arm shaft 115 makes its clockwise rotation. And finally as the piston rod 76 and the carriage 80 are advanced, the right closing chain 146 is caused to wrap around the right lower sprocket 63 as the right clamp arm shaft 149 makes its counterclockwise rotation. These cooperating motions cause the clamp arm shafts 115, 149 with the attached clamp arms 21, 22 (FIG. 11), to counter rotate with respect to each other. That is, one clamp arm rotates clockwise while the other clamp arm rotates counterclockwise. Furthermore, as shown in FIG. 9, the oblique angle of the mounting of the clamp arms 21, 22 to their shafts 115, 149 and rotation of the clamp arm shafts 115, 149 causes the clamp arms 21, 22 to rotate from a vertical position to a horizontal position with an opening formed by the shape of the clamp arms configured to beneficially clamp a refuse container.

Referring now to FIG. 5, after a container is in the firm grip of the clamp arms, pressurized hydraulic fluid is provided to the cylinder portion 35 of the lift ram 16. This action advances the lift ram piston rod 36 which then rotates the yoke pivot assembly 14 about the lift pivot assembly 12. This rotation of the yoke, to which the lift arm 15 is securely attached, elevates the lift arm 15 and moves the refuse container into position for dumping, shown in FIG. 11.

As shown in FIG. 3, a first deceleration valve 26 is provided in the supply system for the pressurized hydraulic fluid for the lift ram. This valve 26 is operated by a first cam lobe 38 secured to the first end 33 of the lift pivot pin 13. As the lift arm nears its upper limit, the first cam lobe 38, being rotated by the lift pivot pin 13, actuates the first deceleration valve 26 to restrict the flow of hydraulic fluid to the cylinder portion 35 of the lift ram 16. In this fashion, the lift arm decelerates rapidly but smoothly in a precisely defined manner as it approaches its maximum lifting limit at the side of the hopper. With the controlled lifting motions of the lift arm provided by the first deceleration valve 26, the speed of the lifting operation can be maximized without damage to any of the system elements.

With reference to FIG. 11, as the lift arm 15 reaches the proximity of the storage hopper 4, with deceleration controlled as described above, the dump lever 24 contacts the side of the hopper 4 and is displaced outwardly. As shown in FIGS. 8*a* and 11, movement of the dump lever 24 rotates the clamping support frame 20 with respect to the lift arm 15. In this manner the container 51 is tilted and the refuse is deposited in the hopper 4 by gravity. Also, the outward displacement of the dump lever compresses the shock absorbing means 23 which further cushions the impact load on the refuse container handling system 5. Furthermore, upon movement of the lift arm 15 away from the storage hopper 4, the shock absorbing means 23 provides the bias force necessary to restore and maintain the clamping support frame 20 in its pre-dump position with respect to the lift arm 15.

After the refuse is dumped into the hopper, the lift arm is returned to a suitable position to disengage the refuse container by releasing the pressurized fluid from the cylinder portion of the lift ram. Similar to the lifting operation, FIG. 3, shows the second deceleration valve 27 provided in the supply system of the pressurized hydraulic fluid for the lift ram 16. This valve 27 is operated by the second cam lobe 39 secured to the second end 34 of the lift pivot pin 13. As the lift arm 15 nears its lower limit, the second cam lobe 39, being rotated by the lift pivot pin 13, actuates the second deceleration valve 27 to restrict the flow of hydraulic fluid to the piston portion 49 of the lift ram 16. In this fashion, the lift arm 15 decelerates smoothly in a precisely defined manner as it reaches its maximum lower limit prior to release of the refuse container. Again, as is the case of the lifting process, speed of operation is maximized without damage to any components of the refuse container handling system.

Referring again to FIGS. 14 and 15, the pressurized fluid is released from the cylinder portion 84 of the clamping ram 83 and pressurized fluid is supplied to the clamping ram piston portion 85 to disengage the refuse container. This reverses the motions described earlier of the piston rod 76, the carriage 80, the opening and opening chains 110, 113,

143, 146, and the rotation of the clamp arm shafts 115, 149. Thus the clamp arms 21, 22 are rotated away from the container and returned to their vertical stowed position (FIG. 3).

Referring now to FIG. 6, after the container 51 is disengaged and the clamp arms 21, 22 are returned to their normal vertical position, pressurized hydraulic fluid is released from the cylinder portion 90 of the extension ram 28 and pressurized hydraulic fluid is supplied to the extension ram's piston portion 91. This withdraws the extension ram piston rod 92 and returns both lift arm sections 17, 18 to their stowed position beneath the refuse storage hopper as shown in FIGS. 1, 2 and 3. Again the relative motions of the inner and outer lift arm sections 17, 18 are precisely controlled by the lift arm guidebar 60. As the lift arm 15 is moved to its stowed position, the clamp arm guidebar 70 continues to maintain the position of the clamp arms 21, 22 in their vertical orientation and parallel to the axis of the vehicle.

To complete the entire lifting and lowering operation, referring to FIG. 4, the locking pin 88 is removed from its storage location and inserted through the apertures on the first and second locking pin brackets 25, 50. Thus secured, the lift arm 15 is immobilized and its inadvertent extension is prohibited.

It is to be realized that only preferred embodiments of this invention have been described, and that numerous substitutions, modifications, alterations, and applications are permissible without departing from the spirit and scope of the invention as defined in the following claims.

I claim:

1. A method of handling refuse containers including a handling system having a lift arm and a means for engaging and clamping a container for use with a refuse collection vehicle having a storage hopper, comprising the steps of:

stowing the handling system including a lift arm and means for engaging and clamping a container below the storage hopper of the refuse collection vehicle;

extending the lift arm from a stowed position below the hopper to the proximity of a refuse container to be emptied;

engaging and clamping the refuse container by the engaging and clamping means;

lifting the container with the lift arm and clamping means into a position suitable for dumping the contents of the container into the storage hopper;

dumping the refuse from the container into the storage hopper;

lowering the container;

disengaging the container from the clamping means; and retracting the lift arm into the stowed position below the storage hopper.

2. A method of handling containers for collecting refuse according to claim 1 wherein said handling system further includes an extension ram having a cylinder portion and a piston portion, said extension ram being connected to the lift arm, said clamping means including a clamping ram having a cylinder portion and a piston portion, a lifting and lowering means connected to the lift arm, and said step of extending the lift arm further includes supplying hydraulic fluid to the cylinder portion of the extension ram, said step of engaging and clamping the refuse container includes supplying pressurized hydraulic fluid to the cylinder portion of the clamping ram, said step of lifting the container includes supplying pressurized hydraulic fluid to the lifting and lowering means, said step of lowering the container includes releasing pressurized hydraulic fluid from the lifting and lowering means whereby gravity returns the lift arm for disengaging the refuse container, said step of disengaging the container from the clamping means includes releasing the pressurized hydraulic fluid from the cylinder portion of the clamping ram and supplying pressurized hydraulic fluid to the piston portion of the clamping ram, and said step of retracting the lift arm into its stowed position below the storage hopper includes releasing the pressurized hydraulic fluid from the cylinder portion of the extension ram and supplying pressurized hydraulic fluid to the piston portion of the extension ram.

3. A method of handling containers for collecting refuse according to claim 2 wherein said step of engaging and clamping further includes a cooperating pair of clamping arms, a pair of clamp arm shafts, a pair of closing chains and a pair of opening chains, each clamping arm being connected to their respective clamp arm shafts, said shafts being operated by their respective closing and opening chains both chains being connected to the clamping ram, and further comprising the steps of:

supplying pressurized hydraulic fluid to the cylinder portion of the clamping ram, advancing the closing chains, retracting the opening chains, rotating the clamp arm shafts in opposite directions, moving the cooperating pair of clamping arms from a vertical position to a horizontal position, and clamping the refuse container.

4. A method of handling refuse containers including a handling system according to claim 1 further comprising the step of locking the lift arm for movement of the refuse collection vehicle.

5. A method of handling refuse containers including a handling system according to claim 1 wherein said step of lifting the container further includes the step of decelerating the lifting and lowering means as the container approaches the dumping position.

6. A method of handling refuse containers including a handling system according to claim 1 wherein said step of lowering the container further includes the step of decelerating the lifting and lowering means as the container approaches the position for disengaging the container from the clamping means.

7. A refuse container handling system for a refuse collection vehicle having a storage hopper, a frame and a longitudinal axis, comprising:

a means for mounting and stowing said refuse container handling system below the storage hopper, said mounting and stowing means being generally disposed laterally across the frame of said refuse collection vehicle, a means for lifting and lowering a refuse container being pivotally supported by said mounting and stowing means, said lifting and lowering means further including a lift arm, a means for extending and retracting the lift arm from the stowed position below the storage hopper of the refuse collection vehicle to a position proximate to the refuse container to be emptied, a means for engaging and clamping a refuse container, said engaging and clamping means being rotatably and pivotally connected to the lift arm, a means for dumping refuse from the container by gravity, said dumping means being connected between said engaging and clamping means and the lift arm.

8. A refuse container handling system for a refuse handling system according to claim 7 wherein:

said means for mounting and stowing comprises an elongated substantially rectangular beam having a vehicle attachment portion for rigid and secure connection to the frame and/or other suitable structural members of the refuse collection vehicle, said mounting and stowing means further comprising an outboard end portion extending outwardly from the longitudinal axis of the refuse collection vehicle, and downwardly from the vehicle attachment portion for supporting said lifting and lowering means;

said means for lifting and lowering being fixedly and securely attached to the outboard end portion of the mounting and stowing means, said lifting and lowering means further including;

a horizontally disposed lift pivot assembly, a yoke pivot assembly, the yoke pivot assembly being rotatably connected to the lift pivot assembly, the lift arm being fixedly and securely attached to the yoke pivot assembly, and a lift ram being connected between the yoke pivot assembly and the lift pivot assembly whereby operation of the lift ram rotates the yoke pivot assembly about the lift pivot assembly thereby raising and lowering the lift arm, said means for extending and retracting the lift arm includes an extension ram pivotally connected between the yoke pivot assembly and the lift arm for extending the lift arm outwardly from its stowed position by operation of the extension ram.

9. A refuse container handling system according to claim 8 wherein:

said horizontally disposed lift pivot assembly includes;

a lift pivot pin housing containing a lift pivot pin having first and second ends, a lift arm guidebar bracket rigidly and fixedly secured to both the first end of the lift pivot pin and the yoke pivot assembly, said lift arm guidebar bracket depending downwardly from the lift pivot pin, a lift ram anchor beam fixedly and rigidly attached orthogonally to said housing and extending to its distal end downwardly and inwardly towards the longitudinal axis of the refuse collection vehicle, said yoke pivot assembly including;

a yoke pivot pin housing containing a yoke pivot pin having first and second ends, a yoke having upper and lower horns wherein the yoke pivot pin is fixedly disposed therebetween, the upper horn being fixedly connected to the first end of the yoke pivot pin, the lower horn being fixedly connected to the second end of the yoke pivot pin, and the upper horn further being rigidly and fixedly attached orthogonally to the second end of the lift pivot pin, said lift arm including;

an inner lift arm section having a pivot end and a yoke end, said yoke end being fixedly and rigidly attached orthogonally to the yoke pivot pin housing, an outer lift arm section having a pivot end and a clamp end, and an elbow pivot pin having a stub link perpendicular to, and fixedly attached to said elbow pivot pin, said elbow pivot pin being rotatably connected to the pivot end of the inner lift arm section and also being rotatably connected to the pivot end of the outer lift arm section, said lift ram having;

a cylinder portion pivotally connected to the distal end of the lift ram anchor beam of the horizontally disposed lift pivot assembly, and a piston rod portion having a piston rod pivotally connected to the yoke midway between the upper and lower horns whereby on providing pressurized hydraulic fluid to the cylinder portion of the lift ram, the piston rod extends thus rotating the pivot yoke assembly on the lift pivot pin of the lift pivot assembly thereby raising the lift arm, and said extension ram having a cylinder portion pivotally connected to the yoke pivot pin housing and a piston rod portion having a piston rod pivotally connected to the outer lift arm section near its pivot end whereby providing pressurized hydraulic fluid to the cylinder end will advance the extension ram piston rod and cause the stowed lift arm to extend outwardly towards the refuse container in preparation for its engagement and subsequent dumping, and similarly releasing the pressurized hydraulic fluid from the extension ram cylinder portion and providing pressurized hydraulic fluid to the piston rod portion will withdraw the extension ram piston rod and cause the lift arm to retract towards its stowed position.

10. A refuse container handling system according to claim 7 further comprising a means for locking the lift arm for movement of the refuse collection vehicle.

11. A refuse container handling system according to claim 9 wherein said means for lifting and lowering further includes an elongated lift arm guidebar having first and second ends, the first end being pivotally connected to the lift arm guidebar bracket and the second end being pivotally connected to the outer lift arm section in proximity to its pivot end whereby, on extension of the lift ram piston rod, the motion of the lift arm is guided in a predetermined pattern.

12. A refuse container handling system according to claim 8 wherein said means for engaging and clamping further comprises;

a clamping support frame pivotally and rotatably attached to the clamp end of the outer list arm section, left and right clamp arm shafts each having an axis, said shafts being rotatably supported by the clamping support frame, left and right clamp arms each having a generally semicircular elongated form fixedly secured at one end to their respective clamp arm shaft at an obtuse angle to the axis of the shaft, and a means for rotating the clamp arm shafts to cause rotation of the shafts to bring each clamp arm from a vertical orientation into a horizontal orientation with the open portion of each semicircular clamp arm facing the opposite clamp arm for cooperatively engaging and clamping a refuse container.

13. A refuse container handling system according to claim 9 wherein said means for engaging and clamping further comprises an elongated clamp arm guidebar having first and second ends, the first end being connected to the stub sink of said elbow pivot pin and the second end being connected to the clamping support frame to maintain the orientation of the clamp arms parallel to the longitudinal axis of the refuse collection vehicle during the process of extending and retracting the lift arm, thereby presenting the cooperating clamp arms to the refuse container in the optimum position for engagement of the container.

14. A refuse collection vehicle according to claim 13 wherein the outer lift arm has an internal axial bore and the elongated clamp arm guidebar is positioned within the axial bore.

15. A refuse container handling system according to claim 12 wherein said means for rotating the clamp arm shafts comprises;

a clamping ram securely attached to said clamping support frame, two pairs of chain sprockets, one pair fixedly and securely attached to said left clamp arm shaft, one pair fixedly and securely attached to said right clamp arm shaft, a plurality of clamp arm chains attached to said clamping ram and engaged with said sprockets whereby on operation of the clamping ram said chains impart rotary motion to the clamp arm shafts thus causing said clamp arms to engage and clamp the refuse container.

16. A refuse container handling system according to claim 15 wherein said means for rotating the clamp arm shafts further comprises;

said clamping ram having a cylinder portion securely attached to said clamping support frame, said clamping ram further having a piston portion fitted with a carriage having a first end and a second end, said pairs of chain sprockets comprising a left pair of upper and lower chain sprockets having teeth, said sprockets being fixedly and securely attached to the left clamp arm shaft, and a right pair of upper and lower chain sprockets having teeth, said sprockets being fixedly and securely attached to the right clamp arm shaft, said plurality of clamp arm chains comprising;

a left clamp arm closing chain having a first end securely attached to the first end of the carriage, said left closing chain passing counterclockwise substantially around, and engaging the teeth of, the left upper chain sprocket, said left closing chain further having a second end securely attached to the left upper chain sprocket, a right clamp arm closing chain having a first end securely attached to the first end of the carriage, said right closing chain passing clockwise substantially around, and engaging the teeth of, the right upper chain sprocket, said right closing chain further having a second end securely attached to the right upper chain sprocket, a left clamp arm opening chain having a first end securely attached to the second end of the carriage, said left opening chain passing clockwise substantially around, and engaging the teeth of, the left lower chain sprocket, said left opening chain further having a second end securely attached to the left lower chain sprocket, a right clamp arm opening chain having a first end securely attached to the second end of the carriage, said right opening chain passing counterclockwise substantially around, and engaging the teeth of, the right lower chain sprocket, said right opening chain further having a second end securely attached to the right lower chain sprocket, whereby on movement of the piston end of the clamping ram and the resulting translation imparted to the closing and opening chains, the left and right sprockets are caused to counter-rotate with respect to each other, thus on extension of the piston end, the clamp arms move from a vertical position to a horizontal position and thus engage and clamp the refuse container, and on retraction of the piston end, the clamp arms release and disengage the container and then move from a horizontal position to a vertical position.

17. A refuse container handling system according to claim 7 wherein said means for dumping the refuse from the container comprises a dump lever securely attached to the clamping support frame and extending proud therefrom, the dump lever being displaced by the storage hopper as the refuse container is moved into position for dumping above the hopper, thus causing the clamping support frame to rotate with respect to the outer lift arm thereby tilting the refuse container and discharging the refuse into the hopper by gravity.

18. A refuse container handling system according to claim 17 wherein said means for dumping further comprises a means for shock absorbing disposed between the clamping support frame and the outer lift arm, said shock absorbing means being compressed upon rotation of the clamping support frame by the displacement of the dump lever in contact with the storage hopper, said shock absorbing means furthermore returning and maintaining the clamping support frame in its predump position upon movement of the outer lift arm away from the storage hopper.

19. A refuse container handling system according to claim 18 wherein said shock absorber means comprises a gas filled elastomeric bladder.

20. A refuse container handling system according to claim 12 wherein said left and right clamp arms are lined with a durable and resilient material for enhancing the gripping action of the clamp arms and minimizing potential damage to the refuse container.

21. A refuse container handling system according to claim 8 wherein said means for lifting and lowering a refuse container further comprises a first means for decelerating said lifting and lowering means as the container approaches the dumping position.

22. A refuse container handling system according to claim 21 wherein said means for lifting and lowering a refuse container further comprises a second means for decelerating said lifting and lowering means as the container approaches the position for disengagement of the container from the clamping means.

23. A refuse container handling system according to claim 21 wherein said first means for decelerating said lifting and lowering means comprises a first deceleration valve rigidly and fixedly secured to the lift pivot housing and a first cam rigidly and fixedly secured to the first end of the lift pivot pin, said first cam having cam lobes in contact with said first deceleration valve.

24. A refuse container handling system according to claim 22 wherein said second means for decelerating said lifting and lowering means comprises a second deceleration valve rigidly and fixedly secured to the lift pivot housing and a second cam rigidly and fixedly secured to the second end of the lift pivot pin, said second cam having cam lobes in contact with said second deceleration valve.

25. A refuse container handling system according to claim 10 wherein said lift arm locking means comprises a lift arm locking pin flexibly attached to the yoke, a first locking bracket fixedly and securely attached to said outer lift arm section proximate to the clamp end, and a second locking bracket fixedly and securely attached to the yoke, said first and second locking brackets each having a having an aperture, said apertures becoming aligned for cooperatively receiving the locking pin when the lift arm is in its stowed position.

26. A refuse container handling system according to claim 9 wherein said lift pivot pin housing and said yoke pivot pin housings are filled with lubricating oil.

27. A refuse container handling system according to claim 9 wherein said inner and outer lift arm sections are fabricated from a heavy wall, high tensile strength metal tubing.

28. A refuse container engaging and clamping assembly for use with refuse collection systems, comprising;

a clamping support frame, left and right clamp arms, left and right clamp arm shafts respectively connected at an oblique angle to said left and right clamps arms, said shafts being rotatable supported by said clamping support frame, a clamping ram securely attached to said clamping support frame, said clamping ram having a cylinder end securely attached to said clamping support frame, said clamping ram further having a piston end fitted with a carriage having a first end and a second end, a left pair and a right pair of chain sprockets, said left pair fixedly and securely attached to said left clamp arm shaft, said right pair fixedly and securely attached to said right clamp arm shaft, said left pair of chain sprockets comprising upper and lower chain sprockets each having teeth, and said right pair of chain sprockets comprising upper and lower chain sprockets each having teeth, a left clamp arm closing chain having a first end securely attached to the first end of the carriage, said left closing chain passing clockwise substantially around, and engaging the teeth of the left upper chain sprocket, said left closing chain further having a second end securely attached to the left upper chain sprocket, a right clamp arm closing chain having a first end securely attached to the first end of the carriage, said right closing chain passing counterclockwise substantially around, and engaging the teeth of the right upper chain sprocket, said right closing chain further having a second end securely attached to the right upper chain sprocket, a left clams arm opening chain having a first end securely attached to the second end of the carriage, said left opening chain passing counterclockwise substantially around, and engaging the teeth of the left lower chain sprocket, said left opening chain further having a second end securely attached to the left lower chain sprocket, a right clamp arm opening chain having a first end securely attached to the second end of the carriage, said right opening chain passing clockwise substantially around, and engaging the teeth of the right lower chain sprocket, said right opening chain further having a second end securely attached to the right lower chain sprocket, whereby on movement of the piston end of the clamping ram and the resulting translation imparted to the closing and opening chains, the left and right sprockets are caused to counter-rotate with respect to each other, thus on extension of the piston end, the clamp arms move from a vertical position to a horizontal position and thus engage and clamp the refuse container, and on retraction of the piston end, the clamp arms release and disengage the container and then move from a horizontal position to a vertical position.

29. A refuse collection vehicle, comprising;

a frame;

a storage hopper mounted on said frame for receiving refuse; and a means for engaging, lifting and dumping refuse containers, said means being attached to and below said frame whereby said means is compactly and efficiently stowed below said hopper.

* * * * *